US006820119B1

(12) United States Patent
Omizo

(10) Patent No.: US 6,820,119 B1
(45) Date of Patent: Nov. 16, 2004

(54) COMPUTER SYSTEM, COMPUTER MANAGEMENT SYSTEM AND METHOD FOR MANAGING THE COMPUTER SYSTEM IN A NON-ACTIVE STATE THROUGH AN EXTERNAL TERMINAL

(75) Inventor: Takashi Omizo, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 842 days.

(21) Appl. No.: 09/659,680

(22) Filed: Sep. 11, 2000

(30) Foreign Application Priority Data

Jul. 10, 2000 (JP) ........................................ 2000-208875

(51) Int. Cl.[7] .......................... G06F 15/173; G06F 9/44
(52) U.S. Cl. ........................ 709/223; 709/224; 717/171; 717/167; 717/168
(58) Field of Search ................................. 709/223–224; 707/202–204; 717/101, 120, 170, 121, 167–168, 171–172, 176; 455/3.03, 44.2, 151.2, 352, 557

(56) References Cited

U.S. PATENT DOCUMENTS

| 5,363,229 | A | * | 11/1994 | Sakurai et al. | ............... 398/162 |
|---|---|---|---|---|---|
| 5,398,280 | A | * | 3/1995 | MacConnell | .............. 379/93.25 |
| 5,463,663 | A | * | 10/1995 | Maruyama et al. | ......... 375/356 |
| 5,974,238 | A | * | 10/1999 | Chase, Jr. | ................... 709/248 |
| 6,324,692 | B1 | * | 11/2001 | Fiske | ......................... 717/171 |
| 6,334,147 | B1 | * | 12/2001 | Cromer et al. | .............. 709/217 |
| 6,334,150 | B1 | * | 12/2001 | Cromer et al. | .............. 709/223 |

FOREIGN PATENT DOCUMENTS

JP 7-147611 6/1995

* cited by examiner

Primary Examiner—B. Prieto
(74) Attorney, Agent, or Firm—Finnegan, Henderson, Farabow, Garrett & Dunner, L.L.P.

(57) ABSTRACT

A computer system capable of system management from a terminal having a wireless communication function is provided with an IrDA-IF having an IrDA port capable of infrared wireless communication between the terminal and the computer system itself and a system management controller connected to the IrDA-IF, the system management controller performing the system management instructed by the terminal through infrared wireless communication with the terminal through the IrDA-IF.

11 Claims, 8 Drawing Sheets

COMPUTER SYSTEM, COMPUTER MANAGEMENT SYSTEM AND METHOD FOR MANAGING THE COMPUTER SYSTEM IN A NON-ACTIVE STATE THROUGH AN EXTERNAL TERMINAL

CROSS-REFERENCE TO RELATED APPLICATIONS

This application is based upon and claims the benefit of priority from the prior Japanese Patent Application No. 2000-208875, filed Jul. 10, 2000 the entire contents of which are incorporated herein by reference.

BACKGROUND OF THE INVENTION

The present invention relates to a computer system, a computer management system and a system management method capable of managing a system such as monitoring the system, modifying the setting thereof, and the like through an external terminal.

As a computer system capable of managing a system such as monitoring the system, modifying the setting thereof, and the like through an external terminal (management terminal), the following two types have been known.

A first computer system is a system one-to-one connected to an external terminal via a cable, for monitoring the system, modifying the setting thereof, and the like by use of a monitor and a keyboard of the same terminal. This method needs external terminals for the number of computer systems because the external terminals are individually connected to every computer system.

A second computer system is a system connected to an external terminal through a LAN (Local Area Network) and a management computer system, for monitoring the system, modifying the setting thereof, and the like by use of a monitor and a keyboard of the same terminal.

In this method, since a plurality (n units) of computer systems are n-to-one connected to one external terminal through the LAN, the external terminal required is only one regardless of the number of the computer systems.

As mentioned above, the first compute system is one-to-one connected to an external terminal. Therefore, the setting area and the number of wiring are accordingly increased as the number of the computer systems is increased, thereby causing an increase in the number of the external terminals.

Then, there is considered such a method that a plurality of computer systems and one external terminal are connected through a switching device such as a concentrator and the like, and that this switching device switches the connecting party of the external terminal to any computer system, so as to perform the management by one external terminal.

This method, however, needs wiring for the number of computer systems, and further needs a troublesome switching operation.

While, in the second computer system, one external terminal can monitor the system and modify the setting thereof through a LAN, even if the number of the computer systems is increased, as far as they are connected to the LAN.

However, since the respective computer systems must be connected to the LAN, if it becomes impossible to use the LAN due to some failure, monitoring of the system also becomes impossible.

In order to avoid a problem at the time a failure occurs in a LAN, duplication of the LAN can be considered. However, it costs much. Further, a LAN cannot be used without installation of an OS (Operating System) and initial setting.

When system information on a non-volatile memory, such as a BIOS (Basic I/O System: basic input/output system) program, is broken, the system cannot be activated and generally it cannot be recovered via a LAN.

BRIEF SUMMARY OF THE INVENTION

The present invention is made in consideration of the above situation, and an object of the present invention is to provide a computer system, a computer management system and a system management method capable of managing the system such as monitoring the system, modifying the setting thereof, and the like, at ease, through one external terminal, without a troublesome switching operation and without a LAN connection.

A computer system according to a first aspect of the present invention is a computer system which enables system management through a terminal having a wireless communication function, comprising a wireless communication interface capable of wireless communication between the above terminal and itself, and a system management controller which is connected to the wireless communication interface, for executing system management instructed by the above terminal, through wireless communication with the above terminal via the interface. As the wireless communication interface, for example, an infrared data communication interface, or a Bluetooth interface enabling wireless communication by radio waves can be used.

Thus, with a wireless communication interface provided in a computer system, the system management controller within the computer system communicates with a terminal (having a wireless communication function, that is, having a wireless communication interface) through the same interface. Therefore, the system management controller can manage the system such as monitoring the system and modifying the setting of the own computer system, upon receipt of an instruction from the terminal.

Since a plurality of computer systems can be provided in the range where wireless communication with a terminal is possible, one terminal (external terminal) can manage the plurality of the computer systems.

Especially, with inherent computer identification information (computer ID) assigned to each computer system, and with the IDs stored in storing means of the respective computer systems, if a connecting request including the computer ID of the computer system to be managed is sent from a terminal, it is designed in that only the system management controller of the computer system having the computer ID in accord with the computer ID during the connecting request assigned thereto, can return a response indicating a connection with the terminal, in the other words, that communication has been established between the terminal and itself, to the terminal through the wireless communication interface, thereby connecting a terminal with a computer system (a system management controller in it) specified by the terminal at ease. Thus, a plurality of computer systems can be managed by one terminal at ease.

Here, if the computer system can be provided with at least a display for use in displaying a connection with the terminal, and when the system management controller returns a response indicating a connection with the terminal, to the terminal, that effect can be displayed on the display, a manager can easily confirm which system of a plurality of computer systems is connected to the terminal.

In this structure, the system management controller can recovery, modify, and read out the information within the specified information storing means, according to an instruction from the terminal, even at the non-activation time of the computer system.

The present invention is constituted in that a computer system according to a second aspect, further comprises a bridge connected to the system management bus, and a non-volatile memory re-writable for storing a basic input/output system program, which is connected between the bridge and the system management bus, and that the information access means of the system management controller gains access to the non-volatile memory via the system management bus only at the non-activation time of the computer system.

In this structure, since the system management controller can gain access to the non-volatile memory through the system management bus at the non-activation time of the computer system, even if the basic input/output system program (BIOS program) on the non-volatile memory is broken and the system cannot be activated, the basic input/output system can be recovered by transferring the basic input/output system program to the system management controller of the computer system by wireless communication from the terminal, and the system management controller's accessing to the non-volatile memory so as to restore the basic input/output system program.

The present invention is constituted in that a computer system according to the second aspect further comprises a first and a second buses, a CPU connected to the first bus, a first bridge to which the first bus, the second bus, and the main memory that is one of the various information storing means are connected, and a second bridge mutually connecting the second bus and the system management bus, and that the information access means of the system management controller gains access to the main memory via the system management bus, the second bridge, the second bus, and the first bridge, under control of the CPU, at the activation time of the computer system.

In this structure, the system management controller can recovery, modify, and read out the information on the main memory (system management information), through access to the main memory, under control of the CPU, that is, by communicating with a management program executed by the CPU at the activation time of the computer system.

Here, if providing the first bridge with an abnormal time access interface for connecting the main memory to the system management bus at the non-activation time of the computer system, it is possible to recovery, modify, and read out the information on the main memory, through access to the main memory by the information access means of the system management controller via the system management bus, even if in the state where the computer system is stopped.

The present invention is constituted in that a computer system according to the second aspect further comprises a first and a second buses, a CPU connected to the first bus, a first bridge mutually connecting the first bus and the second bus, a second bridge to which the second bus, the system management bus, and a disk storage that is one of the various information storing means are connected, and that the information access means of the system management controller gains access to the disk storage via the system management bus and the second bridge, under control of the CPU, at the activation time of the computer system.

In this structure, the system management controller can recovery, modify, read out (back up) the information on the disk storage (system setting information), through access to the disk storage, under control of the CPU, that is, by communicating with the management program executed by the CPU at the activation time of the computer system.

Here, if providing the second bridge with an abnormal time access interface for connecting the disk storage to the system management bus at the non-activation time of the computer system, it is possible to recovery, modify, and read out the information on the disk storage (system setting information), through access to the disk storage by the information access means of the system management controller via the system management bus, even if in the state where the computer system is stopped.

Further, the present invention is to form a computer management system comprising a terminal having a wireless communication function and a plurality of the computer systems of the above structure.

In this structure, since communication can be established between the terminal and the respective system management controllers of the respective computer systems via the wireless communication interface, without mutually connecting the terminal and the plurality of the computer systems by a LAN (local area network), one terminal can manage a plurality of computer systems by use of the system management controller of the same systems.

Here, if mutually connecting the terminal and the plurality of the computer system by a LAN, it is possible for a terminal to manage the computer systems by the conventional cable communication through a LAN and at the same time manage the computer systems by wireless communication, without mutually disturbing each other.

Moreover, in this structure, information for troublesome initial setting necessary for a LAN connection (initial setting information) can be automatically sent to the system management controller, through the wireless communication interface of the computer system, from the terminal, by wireless communication, and the same controller can set the initial setting information, thereby making it east to connect the terminal and the computer systems with a LAN.

The present invention according to the above computer management system can be established as the invention according to the method (system management method).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, a preferred embodiment of the present invention will be described with reference to the accompanying drawings.

Figure 1:
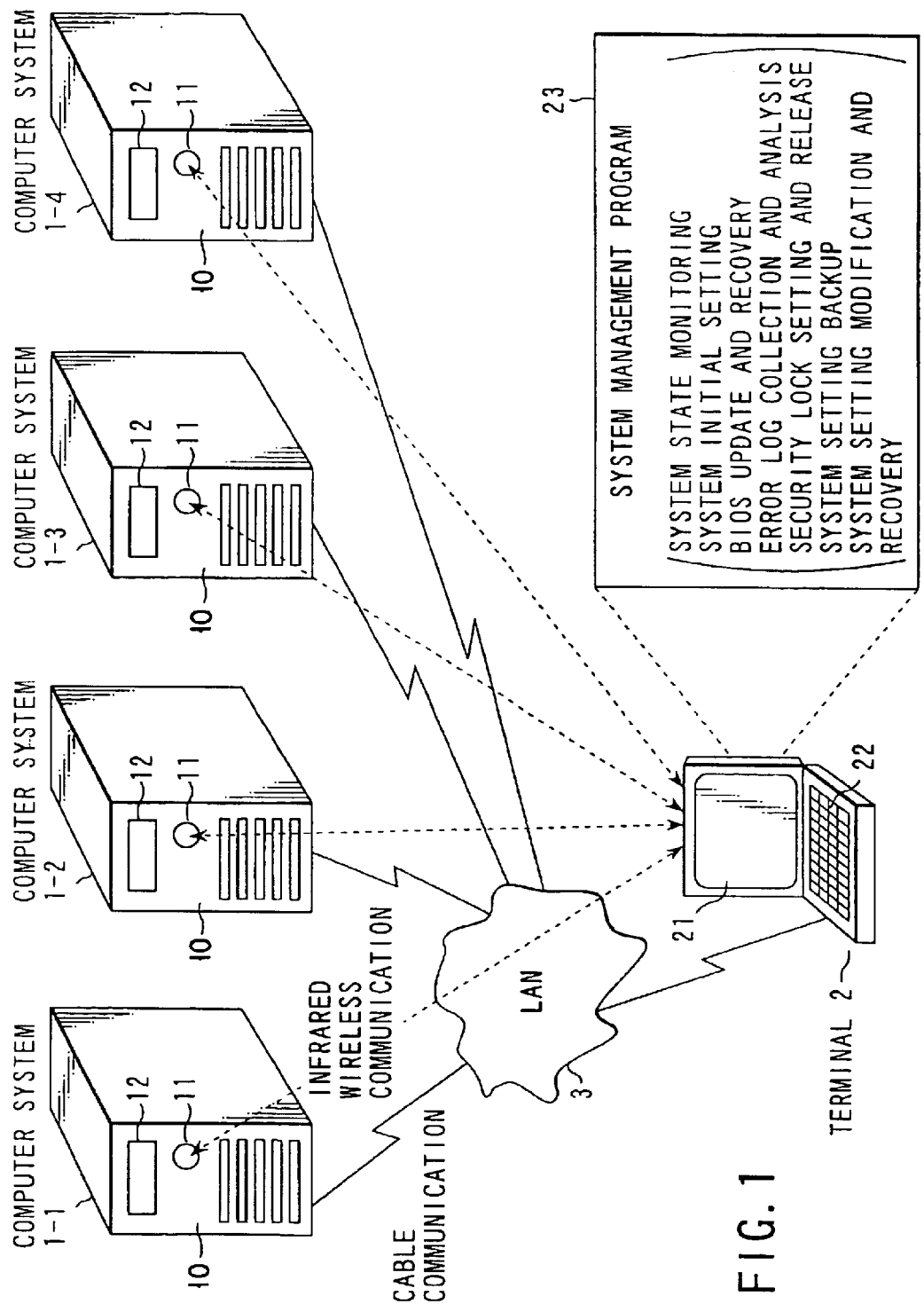
FIG. 1 is a block diagram showing the whole structure of a computer management system in accordance with one embodiment of the present invention.

FIG. 1 is a block diagram showing the whole structure of a computer management system in accordance with an embodiment of the present invention.

As illustrated in FIG. 1, a plurality of computer systems, for example, four computer systems 1-1 to 1-4 are respectively connected to a terminal 2 (external terminal) for managing the computer systems 1-1 to 1-4 (monitoring the system, modifying the setting, and the like) through a LAN 3.

A sending and receiving unit 11 (hereinafter, referred to as an IrDA port) of, for example, an infrared data communication interface (IrDA-IF) as wireless communication means, and a front display 12 having a liquid crystal display are provided, for example, on the front surface of each box 10 of the respective computer systems 1-1 to 1-4.

A terminal 2 is a notebook personal computer provided with, for example, a display 21, a keyboard 22, and an IrDA-IF (not illustrated) having an IrDA port. A system management program 23 for managing the computer systems 1-1 to 1-4, through cable communication via a LAN 3, or through infrared wireless communication via the IrDA-IF, is installed in the terminal 2 (a storing unit of the terminal 2 not illustrated). The system management program 23 provides a function of managing the computer systems 1-1 to 1-4, such as, for example, monitoring of the system state (system monitoring), initial setting of the system, update and recovery of the BIOS program, extraction and analysis of error log, backup of the system setting, modification and recovery of the system setting.

Figure 2:
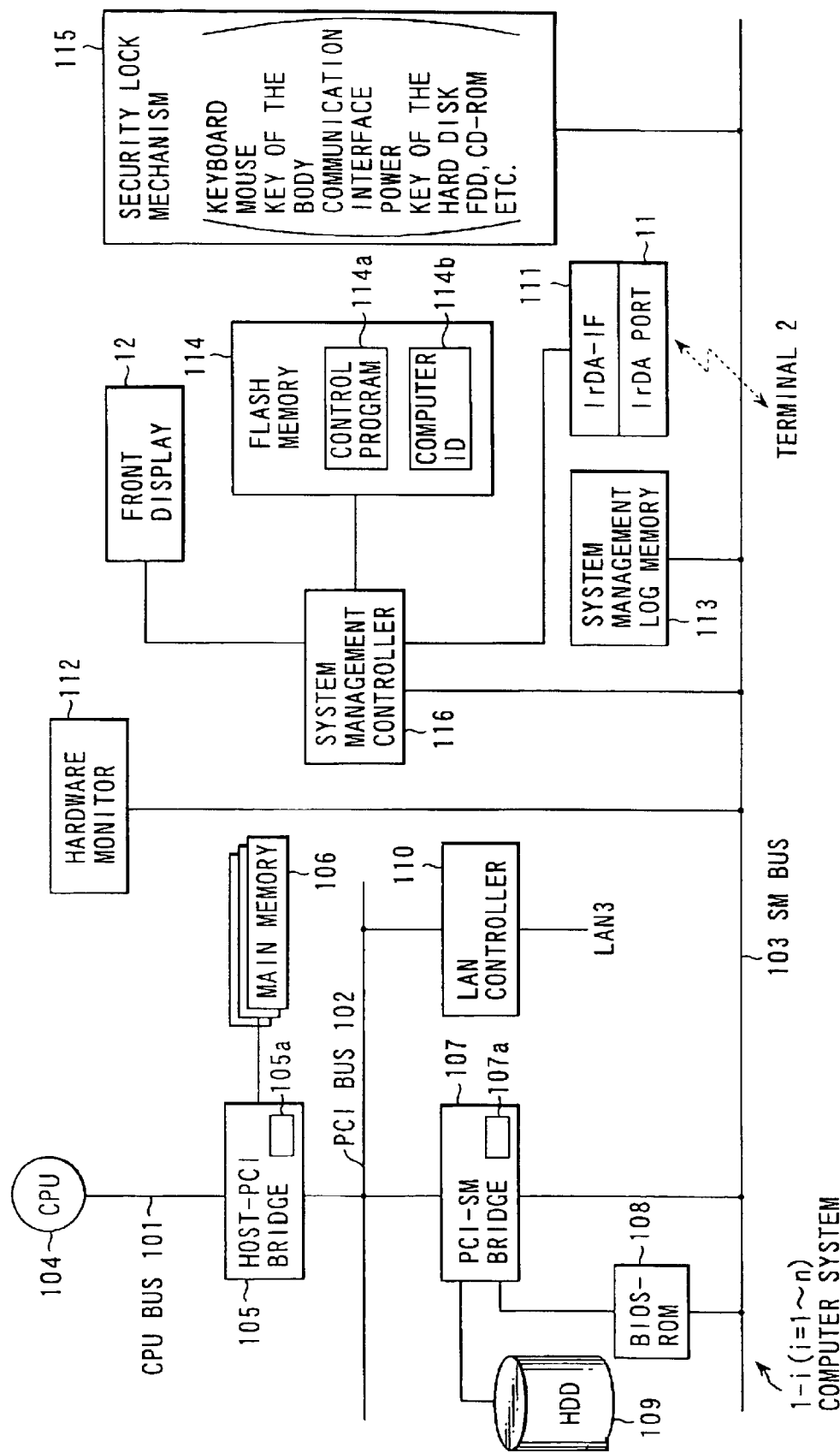
FIG. 2 is a block diagram showing the internal structure of a computer system 1-$i$ ($i$=1 to 4) of FIG. 1.

FIG. 2 is a block diagram showing the internal structure of the computer system 1-$i$ ($i$=1-4) of FIG. 1.

As illustrated in FIG. 2, the computer system 1-$i$ is provided with a CPU bus 101, a PCI bus 102, a system management bus (hereinafter, referred to an SM bus) 103, a CPU 104, a host-PCI bridge 105, a main memory 106, a PCI-SM bridge 107, a BIOS-ROM 108, a disk storage (HDD) 109, and a LAN controlled 110.

The CPU 104 is to control the whole operation of the computer system 1-$i$, executing the BIOS program (basic input/output system program) of the, BIOS-ROM 108, the operating system (OS) loaded into the main memory 106, and the other program.

The host-PCI bridge 105 is a bridge for connecting the CPU bus 101 and the PCI bus 102 in a bi-directional way. A memory control function for controlling access to the main memory 106 is built in the host-PCI bridge 105. An abnormal time access interface (hereinafter, referred to as an abnormal time access IF) 105$a$ for connecting the main memory 106 and the SM bus 103 in a bi-directional way at the system reset time is also built in the host-PCI bridge 105.

This abnormal time access IF 105$a$ permits the system management controller 116 described later to have (reading/writing) access to the main memory 106 through the SM bus 103 at the system non-activation time.

The main memory 106 is used to store the operating system, the application program/utility to be processed, and the user data created by the application program/utility.

The PCS-SM bridge 107 is a bridge for connecting the PCI bus 102 and the SM bus 103. The PCI-SM bridge 107 can operate as a bus master of the PCI bus 102. A function for controlling access to the BIOS-ROM 108 and the disk storage 109 is built in the PCI-SM bridge 107. An abnormal time access interface (hereinafter, referred to as an abnormal time access IF) 107$a$ for connecting the disk storage 109 and the SM bus 103 in a bi-directional way at the system reset time is also built in the PCI-SM bridge 107. The abnormal time access IF 107$a$ permits the system management controller 116 to have (reading/writing) access to the system management information on the disk storage 109 through the SM bus 103 at the system non-activation time.

The BIOS-ROM 108 is used for storing the BIOS (BIOS program). The BIOS-ROM 108 is formed by a writable non-volatile memory such as a flash memory so as to rewrite the program. The BIOS-ROM 108 is connected with the PCI-SM bridge 107 as well as with the SM bus 103, and it is accessible from the CPU 104 through the PCI-SM bridge 107 at the activation time of the system, while it is accessible from the system management controller 116 through the SM bus 103 at the non-activation time of the system.

The disk storage 109 is used for storing various application programs/utilities, various user data, and the like.

The LAN controller 110 is used for connecting the computer system 1-$i$ with the LAN 3 via the PCI bus 102.

The computer system 1-$i$ is also provided with a front display 12, an IrDA-IF 111, a hardware monitor 112, a system management log memory 113, a flash memory 114, a security lock mechanism 115, and the system management controller 116.

The front display 12 is used for displaying the state in which the system management controller 116 of the computer system 1-$i$ is connected with the terminal 2.

The IrDA-IF 111 is connected with the system management controller 116, for use in performing infrared wireless communication between the system management controller 116 and the terminal 2 through the IrDA port 11.

The hardware monitor 112 is used for monitoring the state of each hardware. The hardware monitor 112 is connected with the SM bus 103, and the system management controller 116 has only a reading access to the hardware monitor 112 through this SM bus 103 at both the activation time and the non-activation time of the system.

The system management log memory 113 is used for storing the log data of the system management. The system management log memory 113 is connected with the SM bus 103, and in any case of the system activation and non-activation, the CPU 104 and the system management controller 116 have a reading/writing access to the system management log memory 113.

The flash memory 114 is a writable non-volatile memory for storing a control program 114$a$ of the system management controller 116 and the inherent ID (computer ID) assigned only to the corresponding computer system 1-$i$. The control program 114$a$ is a program enabling establishment of wireless communication between the terminal 2 and the system management controller 116 without initial setting, that is, an automatic connection between the terminal 2 and the system management controller 116 within the computer system 1-$i$.

By providing the control program 114$a$ and the computer ID 114$b$, even if there are a plurality of computer systems 1-$i$ to be managed by the terminal 2 (four systems in the example of FIG. 1), all the computer systems 1-*i* (the computer systems 1-1 to 1-4 in the example of FIG. 1) can be managed only by one terminal 2, using the computer ID 114*b* of the computer system 1-*i* to be managed, through infrared wireless communication performed by the terminal 2 via the IrDA-IF 111 according to the system management program 23, and performed by the system management controller 116 of the computer system 1-*i* via the IrDA-IF 111 according to the control program 114*a*.

The security lock mechanism 115 is of an aggregate type of security lock objects, namely, various resources to become an object of security lock within the computer system 1-*i* (keyboard, mouse, key of the box, communication interface, power, key of the disk storage 109, floppy disk drive, CD-ROM drive, and the like). The above-mentioned elements of the security lock mechanism 115 are connected with the SM bus 103. The security lock mechanism 115 is designed to permit the system management controller 116 to gain access for setting and releasing the security lock to themselves via the SM bus 103.

Figure 3:
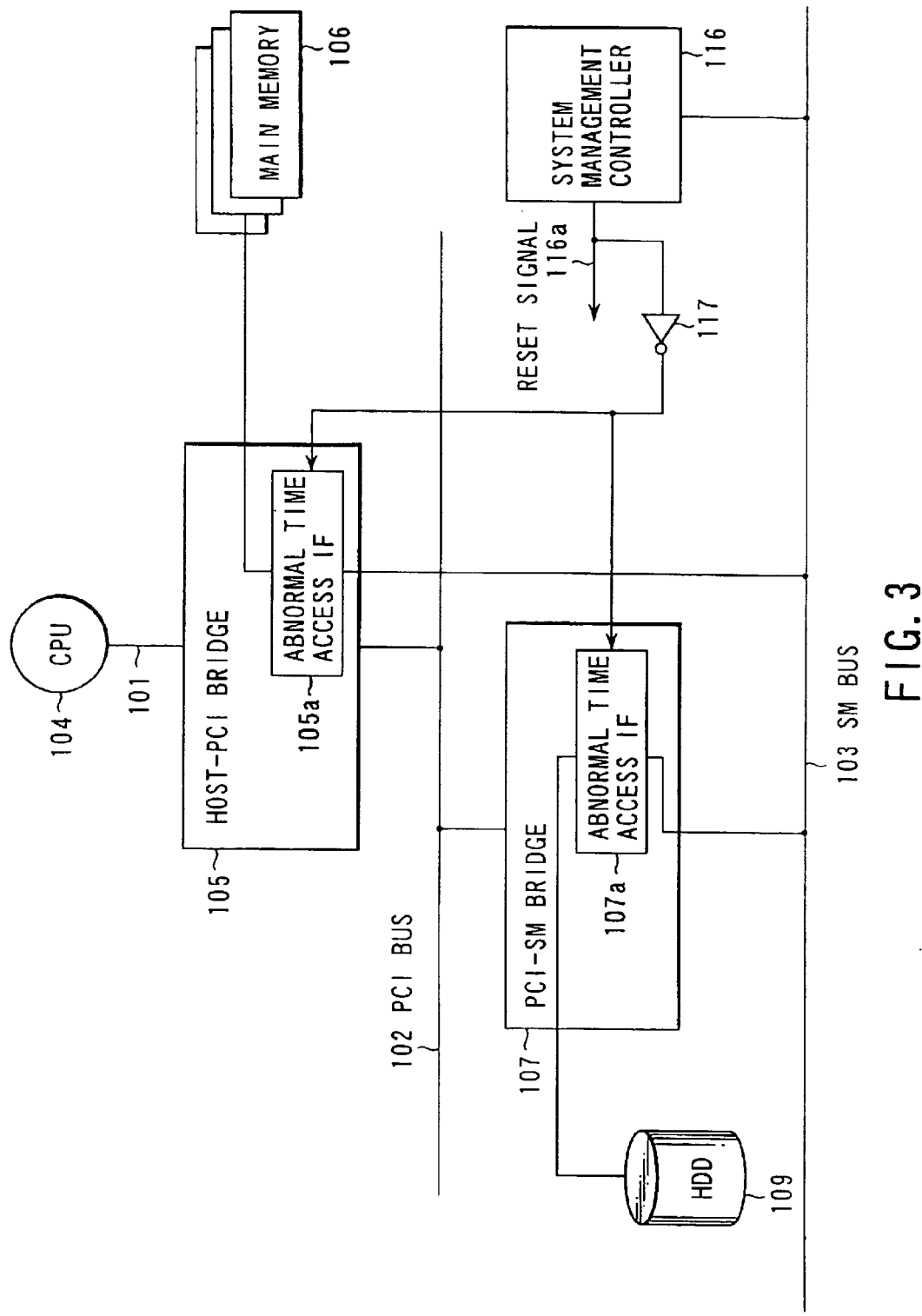
FIG. 3 is a block diagram showing the structure near abnormal time access IF 105$a$ and IF 107$a$ provided on a bridge 105 and a bridge 107 of the computer system 1-$i$ of FIG. 2.

FIG. 3 is a block diagram showing the structure near the abnormal time access IF 105*a* and IF 107*a* provided on the bridges 105 and 107 of the computer system 1-*i* of FIG. 2.

As illustrated in FIG. 3, an inverter 117 inverts the level of a system reset signal 116*a* supplied from the system management controller 116 and supplies the same to the abnormal time access IF 105*a* and IF 107*a*.

The abnormal time access IF 105*a* is designed in that when the system reset signal 116*a* is true (namely, non-activation time of the system), it becomes active so as to connect the main memory 106 with the SM bus 103, and when it is false (namely, activation time of the system), it becomes non-active so as to cut off the main memory 106 from the SM bus 103. The abnormal time access IF 107*a* is designed in that when the system reset signal 116*a* is true, it becomes active so as to connect the disk storage 109 with the SM bus 103, and when it is false, it becomes non-active so as to cut off the disk storage 109 from the SM bus 103.

In FIG. 2, the conventional access IF (normal time access IF) generally built in the bridges 105 and 107 are omitted there. The normal time access IF is contrary to the abnormal time access IFs 105*a* and IF 107*a*. When the reset signal is false, it becomes active and the normal time access IF within the bridge 105 connects the main memory 106 with the CPU bus 101 and the PCI bus 102, and the normal time access IF within the bridge 107 connects the BIOS-ROM 108 and the disk storage 109 with the PCI bus 102 and the SM bus 103.

Next, referring to FIGS. 4 and 6-10 the operation in the case of managing some computer system, for example, the computer systems 1-1, through the terminal 2 in the embodiment will be described respectively (1) when connecting the terminal 2 with the computer system 1-1, (2) when reading out the system management information from the terminal 2 at the normal activation time of the computer system 1-1, (3) when reading out the system management information from the terminal 2 in the state where the computer system 1-1 is stopped due to a failure, (4) when recovering the information of the BIOS-ROM 108 (BIOS program) from the terminal 2 in the state where the computer system 1-1 is stopped due to a failure, (5) when setting the initial setting information from the terminal in the computer system 1-1, (6) when setting the security lock mechanism 115, and (7) when releasing the security lock mechanism 115.

(1) When Connecting the Terminal 2 with the Computer System 1-1

Figure 4:
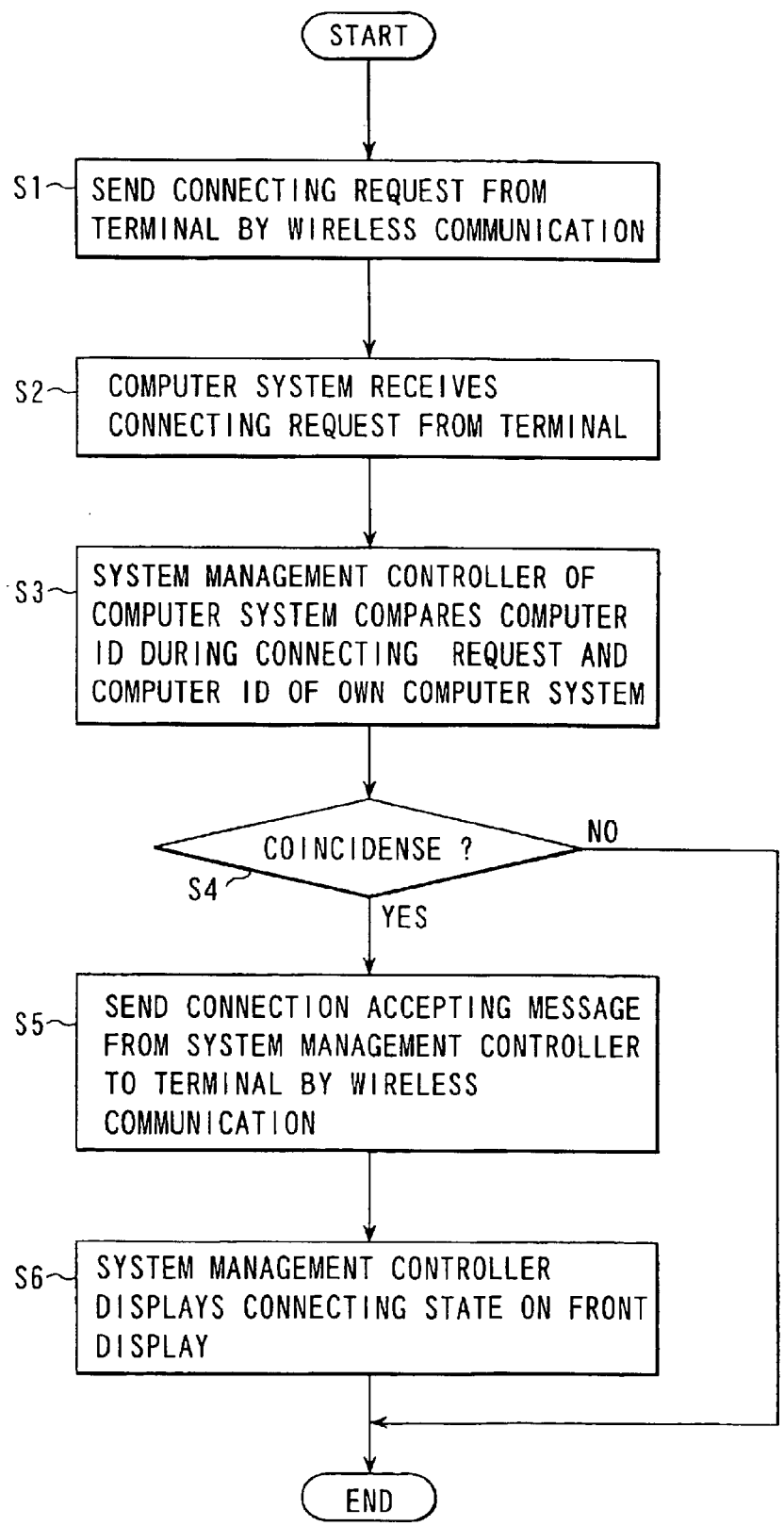
FIG. 4 is a flow chart for use in describing the operation in the case of connecting a terminal 2 with the computer system 1-1.

First, the operation in the case of connecting the terminal 2 with the computer system 1-1 will be described with reference to the flow chart of FIG. 4.

In this embodiment, the terminal 2, and the respective computer systems 1-1 to 1-4 managed by the terminal 2 are positioned within the range where the IrDA ports 11 owned by the respective computer systems 1-1 to 1-4 can communicate with the IrDA port (not illustrated) of the terminal 2 by infrared rays. In these positions, the terminal 2 can be connected with a computer system to be managed actually, for example, the computer system 1-1, of the computer systems 1-1 to 1-4, in the following way.

A manager operates the terminal 2 so as to send a connecting request including the computer ID assigned to the computer system 1-1 to be managed actually, from the IrDA port of the terminal 2, by infrared rays, according to the system control program 23 installed in the terminal 2 (Step S1).

The connecting request sent from the IrDA port of the terminal 2 is received by the IrDA ports 11 of the respective computer systems 1-1 to 1-4, and it is handed from the IrDA-IF 111 to the system management controller 116 of each of the computer systems 1-1 to 1-4 (Step S2).

The system management controller 116 of each computer system 1-1 to 1-4, upon receipt of the connecting request from the terminal 2 through the IrDA port 11, compares the computer ID during the connecting request with the computer ID 114*b* stored in the flash memory 114 of each own computer system 1-1 to 1-4 (Step S3), and detects the coincidence of the both IDs (Step S4). Here, the system management controller 116 of the computer system 1-1 detects the coincidence and the other computer systems 1-2 to 1-4 detect non-coincidence.

The system management controller 116 of the computer system 1-1 having detected the ID coincidence sends a connection accepting message indicating that the own computer system 1-1 has been connected with the terminal 2, from the IrDA port 11 of the IrDA-IF 111 to the terminal 2 (Step S5). Thus, the connection between the terminal 2 and the computer system 1-1 has been completed, and the system management controller 116 of the computer system 1-1 can communication with the system management program 23 of the terminal 2 through the IrDA port 11 of the IrDA-IF 111. The system management controllers 116 of the computer systems 1-2 to 1-4 having detected the non-coincidence of the IDs do nothing.

The system management controller 116 of the computer system 1-1 having detected the ID coincidence displays that it is connected with the terminal 2, on the front display 12 of the computer system 1-1, at the time of sending the connection accepting message, namely at the time the connection has been completed (Step S6). Thus, a manager can easily confirm which computer system is actually connected with the terminal 2.

The system management controller 116 of the computer system 1-1 is connected with the SM bus 103, and through the SM bus 103, the information within the own computer system can be collected and set as described later. The SM bus 103 and the PCI bus 102 are mutually connected by the PCI-SM bridge 107, and the PIC bus 102 and the CPU bus 101 are mutually connected by the host-PCI bridge 105. Therefore, the system management controller 116 can communicate with the CPU 104 if the same CPU 104 connected to the CPU bus 101 is under activation.

(2) When Reading Out the System Management Information from the Terminal 2 at the Normal Activation Time of the Computer System 1-1

Figure 6:
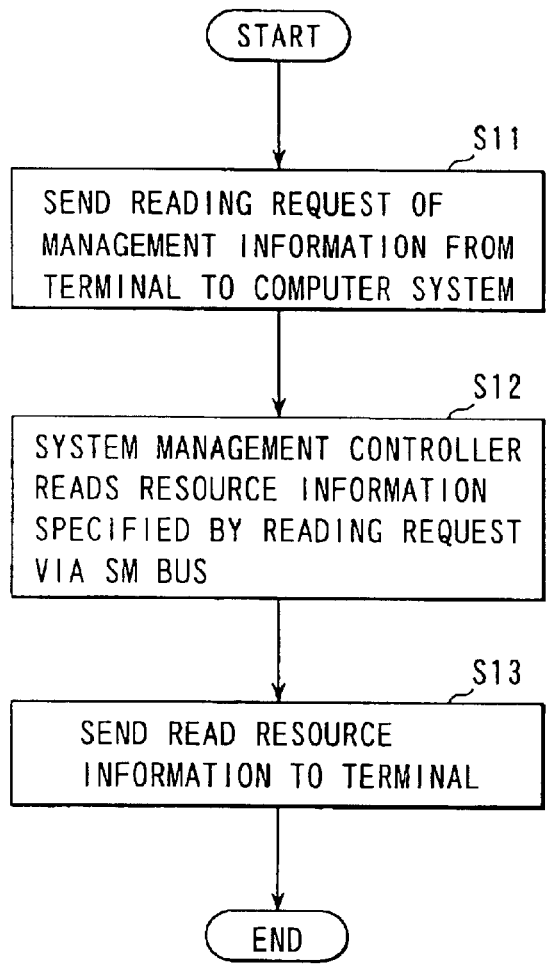
FIG. 6 is a flow chart for use in describing the operation in the case of reading out the system management information from a terminal at the normal activation time of a computer system.

First, a reading request of the system management information is sent from the IrDA port of the terminal 2 to the computer system 1-1 being connected now (Step S11: FIG. 6). This reading request includes the information (for example, address information) for specifying the resource (as the information storing means) within the computer system 1-1 holding the system management information to be read out.

The system management controller 116 of the computer system 1-1, upon receipt of the system management information reading request sent from the terminal 2 to the own computer system, reads out the information of the resource specified by this reading request through the SM bus 103 (Step S12).

If the disk storage 109 is specified as the resource to be read out, the system management controller 116 can gain access to the disk storage 109 so to read out the system setting information stored in the same disk storage 109, while communicating with a management program run by the CPU 104, through the SM bus 103, the PCI-SM bridge 107, the PCI bus 102, and the host-PCI bridge 105.

Similarly, it can read out the information of the main memory 106. If the hardware monitor 112 is specified, the monitor information collected by the same hardware monitor 112 can be read out through the SM bus 103.

When the system management log memory 113 is specified, the system management log information stored in the same log memory 113 can be read out through the SM bus 103.

After reading out the information specified by the system management information reading request, through the SM bus 103, the system management controller 116 sends the same information from the IrDA port 11 of the IrDA-IF 111 to the terminal 2 (Step S13).

(3) When Reading Out the System Management Information from the Terminal 2 in the State where the Computer System 1-1 is Stopped due to a Failure A reading request of the system management information is sent to the computer system 1-1 being connected now similarly in the case of the above (2). Differently from the above (2), the computer system 1-1 is stopped, and therefore the system management controller 116 cannot communicate with the management program of the CPU 104. Accordingly, a method of gaining access to the disk storage 109 through the communication with the same management program cannot be adopted.

Therefore, the abnormal time access IF 107a is provided within the PCI-SM bridge 107 in the embodiment. When the computer system 1-1 is stopped, in reply to a reset signal supplied from the system management controller 116 as illustrated in FIG. 3, this abnormal time access IF 107a can connect the disk storage 109 to the operable SM bus 103 in a bi-directional way even in the case where the computer system 1-1 is not activated, so that the system management controller 116 can gain a direct access to the disk storage 109 through the SM bus 103.

Similarly, the abnormal time access IF 105a is provided within the host-PCI bridge 105. When the computer system 1-1 is stopped, in reply to a reset signal supplied from the system management controller 116, the same abnormal time access IF 105a connects the main memory 106 to the SM bus 103 in a bi-directional way, so that the system management controller 116 can gain a direct access to the main memory 106 through the SM bus 103.

Figure 7:
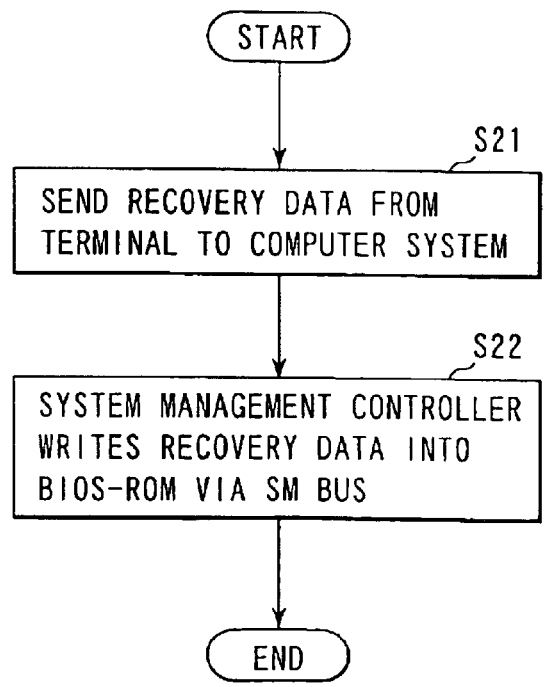
FIG. 7 is a flow chart for use in describing the operation in the case of recovering the information of the BIOS-ROM through a terminal when the computer system is stopped due to a failure.

(4) When Recovering the Information of the BIOS-ROM 108 Through the Terminal 2 in the State where the Computer System 1-1 is Stopped due to a Failure First, the recovery data as for the BIOS-ROM 108 of the computer system 1-1 being connected now (BIOS-ROM recovery data) is sent from the IrDA port of the terminal 2 (Step S21: FIG. 7).

Upon receipt of the BIOS-ROM recovery data sent from the terminal 2, through the IrDA-IF 111, the system management controller 116 of the computer system 1-1 writes the recovery data directly into the BIOS-ROM 108 through the SM bus 103, without passing through the PCI-SM bridge 107 (Step S22: FIG. 7).

When the computer system 1-1 is stopped, it is also possible to read the information of the BIOS-ROM 108 (BIOS program) itself directly therefrom through the SM bus 103 as well as write the information into the above BIOS-ROM 108.

(5) When Setting the Initial Setting Information in the Computer System 1-1, Through the Terminal 2

Figure 8:
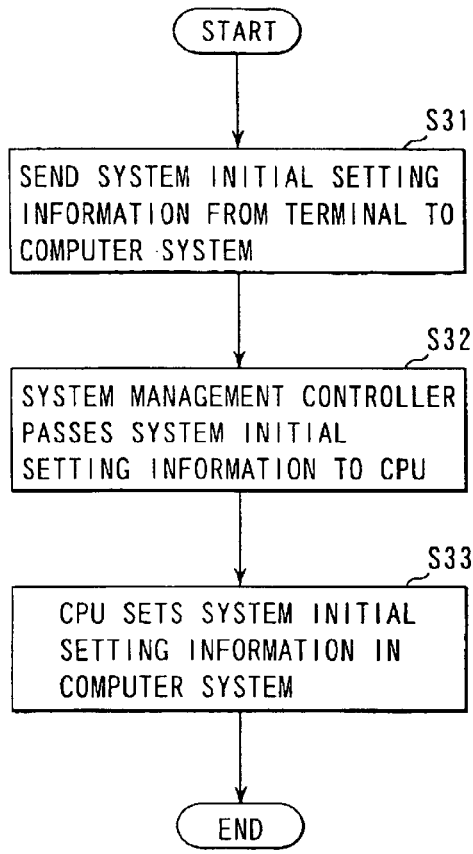
FIG. 8 is a flow chart for use in describing the operation in the case of setting the initial setting information in a computer system through a terminal.

First, the system initial setting information is sent from the IrDA port of the terminal 2 to the computer system 1-1 being connected now (Step S31: FIG. 8).

Upon receipt of the system initial setting information sent from the terminal 2, through the IrDA-IF 111, the system management controller 116 of the computer system 1-1 communicates with the initial setting program on the main memory 106 activating on the same computer system 1-1, through the SM bus 103, the PCI-SM bridge 107, the PCI bus 102, and the host-PCI bridge 105, and passes the received system initial setting information to the CPU 104 (Step S32: FIG. 8).

Thus, the CPU 104 sets the received system initial setting information in the computer system 1-1 according to the initial setting program (Step S33: FIG. 8).

(6) When Setting the Security Lock Mechanism 115

Figure 9:
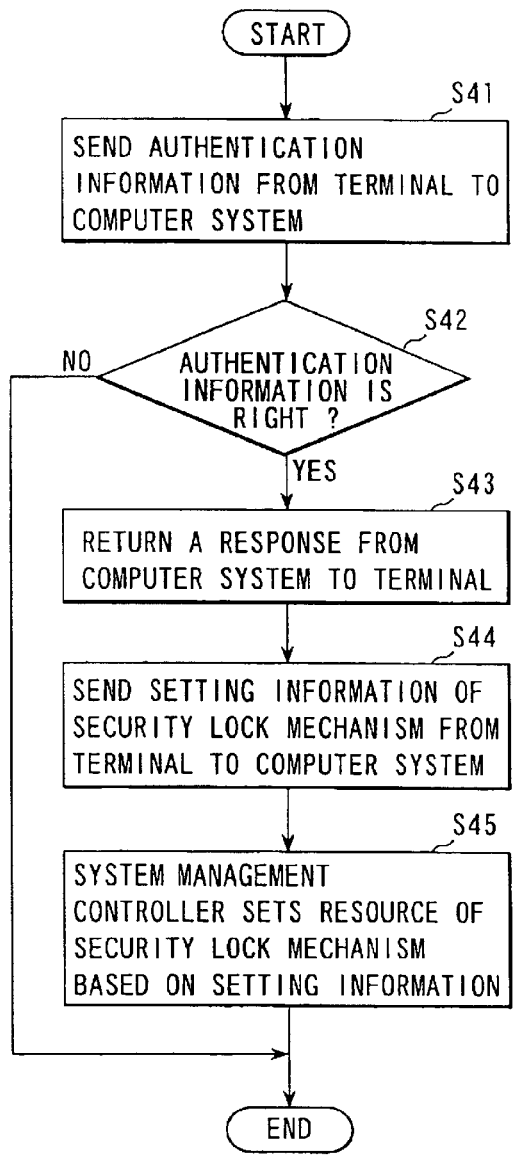
FIG. 9 is a flow chart for use in describing the operation in the case of setting a security lock mechanism through a terminal.

First, the authentication information for security lock access is sent from the IrDA port of the terminal 2 to the computer system 1-1 being connected now (Step S41: FIG. 9).

Upon receipt of the authentication information sent from the terminal 2, through the IrDA-IF 111, the system management controller 116 of the computer system 1-1 performs the authentication processing for judging whether the same authentication information is right or not (Step S42: FIG. 9). If it is right, a response is returned to the terminal 2 from the IrDA port 11 of the IrDA-IF 111 (Step S43: FIG. 9).

Upon receipt of the response on the side of the computer system 1-1, the terminal 2 sends the setting information of the security lock mechanism 115 from the IrDA port of the terminal 2 (Step S44: FIG. 9).

Upon receipt of the setting information of the security lock mechanism 115 from the terminal 2, the system management controller 116 of the computer system 1-1 sets a lock on the resource within the security lock mechanism 115 specified by the same setting information, through the SM bus 103, based on the same setting information (Step S45: FIG. 9).

The resource having the lock established there is locked, and the resource cannot be operated unless the lock is freed in a right way.

(7) When Releasing the Security Lock Mechanism 115

Figure 10:
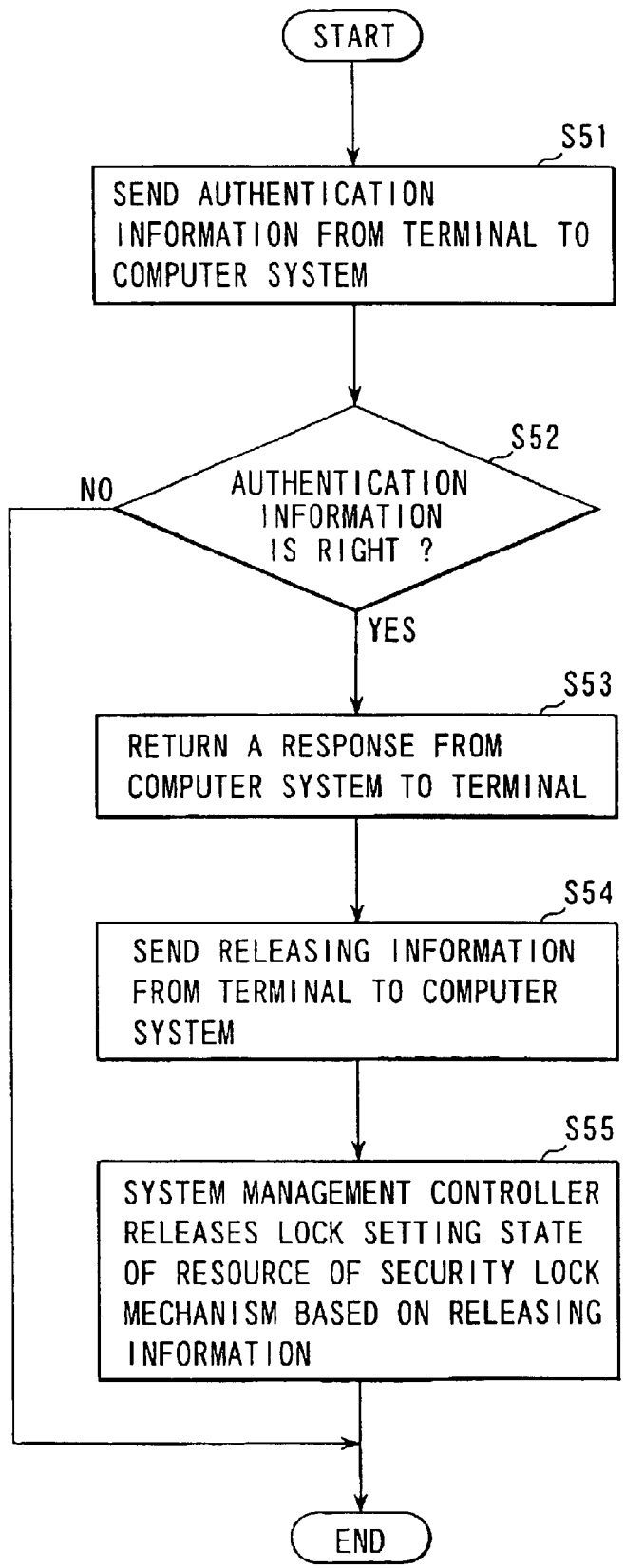
FIG. 10 is a flow chart for use in describing the operation in the case of releasing the security lock mechanism.

First, the authentication information for the security lock access is sent from the IrDA port of the terminal 2 to the computer system 1-1 being connected now (Step S51: FIG. 10).

Upon receipt of the authentication information sent from the terminal 2, through the IrDA-IF 111, the system management controller 116 of the computer system 1-1 performs the authentication processing for judging whether the same authentication information is right or not (Step S52: FIG. 10). If it is right, a response is returned from the IrDA port 11 of the IrDA-IF 111 to the terminal 2 (Step S53: FIG. 10).

Upon receipt of the response on the side of the computer system 1-1, the terminal 2 sends the releasing information of the security lock mechanism 115 from the IrDA port of the same terminal 2 (Step S54: FIG. 10).

Upon receipt of the releasing information of the security lock mechanism 115 sent from the terminal 2, the system management controller 116 of the computer system 1-1 releases the locked state of the resource within the security lock mechanism 115 specified by the releasing information, through the SM bus 103, based on the same releasing information (Step S55: FIG. 10).

There are various methods adoptable as the above authentication processing by means of the system management controller 116, for example, the authentication processing by a check of the ID and password, and a check of the biometrical characteristics such as a fingerprint check and a voice check, and the authentication method is not restricted.

Besides, the control program 114*a* itself of the system management controller 116 stored in the flash memory 114 can be updated through the wireless communication from the terminal 2, via the IrDA-IF 111.

In the embodiment, the respective computer systems 1-1 to 1-4 are connected to the LAN 3 similarly to the second computer system as mentioned in the prior technique, by the LAN controller 110 (refer to FIG. 2). The terminal 2 is also connected to the LAN 3 by the LAN controller not illustrated. That is, the computer systems 1-1 to 1-4 and the terminal 2 are mutually connected by the LAN 3.

In this structure, the terminal 2 can serve to manage the computer systems 1-*i* by the conventional cable communication through the LAN 3 (monitor the system and modify the setting thereof) and manage the computer systems 1-*i* by the infrared wireless communication through the above-mentioned IrDA-IF.

The terminal 2 selects the optimum means of the infrared wireless communication through the IrDA-IF or the wired communication through the LAN 3, depending on the situation of the system, according to the system management program 2, in order to manage the computer systems 1-*i*. This can realize the system management of high availability without a manager's switching.

Although the above-mentioned embodiment has been described in the case of using the IrDA-IF as a wireless IF (interface) in order to do infrared wireless communication between the computer systems 1-1 to 1-4 and the terminal 2, it is not restricted to this. For example, it is also possible to use a wireless communication IF capable of wireless communication by radio waves such as the Bluetooth IF. Namely, the present invention can adopt any IF (wireless communication IF) as long as it is an IF capable of wireless communication.

Figure 5:
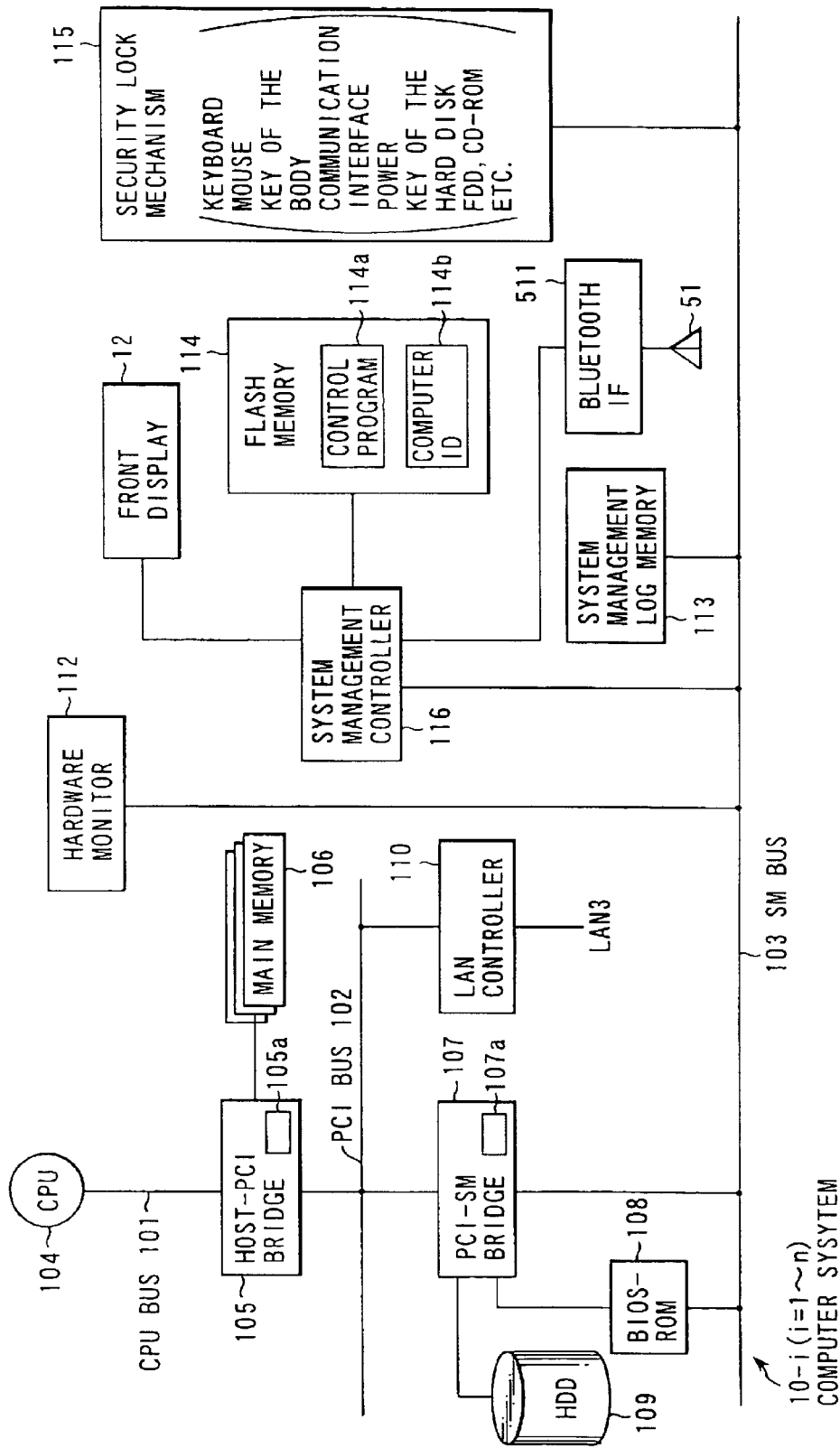
FIG. 5 is a block diagram showing an example of a computer system using the Bluetooth IF instead of the IrDA-IF as the wireless communication IF.

An example of the computer system using the Bluetooth IF (Bluetooth controller) instead of the IrDA-IF as the wireless communication IF is shown in FIG. 5. Here, the same reference numeral is attached to the same portion as that of FIG. 2.

The structure of the computer system 10-*i* shown in FIG. 5 is different from the structure of the computer system 1-*i* of FIG. 2 in that the Bluetooth IF 511 having an antenna 51 is replaced by the IrDA-IF 111 having the IrDA port 11. The Bluetooth IF 511 is connected to the system management controller 116.

When the computer system 10-*i* having the structure of FIG. 5 is replaced by the computer system 1-*i* (i=1 to 4), in the computer management system of FIG. 1, it is necessary to use a terminal such as a notebook personal computer provided with the same Bluetooth IF as the Bluetooth IF 511 owned by the computer system 10-*i*, as the wireless communication IF, instead of the terminal 2. In this case, the system management controller 116 within the computer system 10-*i* can perform wireless communication by radio waves with the terminal having the same Bluetooth IF as the Bluetooth IF 511, through the Bluetooth IF 511.

The present invention is not restricted to the above-mentioned embodiment, but various modifications may be made without departing from the spirit thereof. Further, the above-mentioned embodiment includes various steps of inventions, and various inventions may be extracted by a proper combination of a plurality of components disclosed. For example, even if some components are deleted from the whole components shown in the embodiment, this structure with the component deleted therefrom may be extracted as the invention as far as it can solve the problem as mentioned in the summary of the invention and as far as it can make the same effect as mentioned there.

As set forth hereinabove, according to the present invention, the computer system is provided with a wireless communication interface, and through the interface, the system management controller within the computer system communicates with a terminal having a wireless communication function. Accordingly, the system management controller, upon receipt of an instruction from the terminal, can perform the system management such as monitoring of the system, modification of the setting of the own computer system, thereby enabling one terminal to manage a plurality of computer systems without any troublesome switching operation and LAN connection.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system managed by a terminal having a wireless communication function, comprising:

a CPU, connected to a first bus, which controls the computer system;

a non-volatile memory, connected to the first bus and a second bus, which stores a basic input/output system program;

a wireless communication interface capable of wireless communication with said terminal; and a system management controller connected to said wireless communication interface and the second bus, which performs system management instructed by said terminal, through wireless communication with said terminal via said wireless communication interface, wherein the CPU accesses the non-volatile memory via the first bus when the computer system is in an active state and the system management controller accesses the non-volatile memory via the second bus when the computer system is in a non-active state.

2. The computer system according to claim 1, further comprising:

computer identification information storing means for storing inherent computer identification information of said computer system itself, wherein said system management controller further includes coincidence detecting means for, when receiving a connecting request including said computer identification information sent from said terminal via said wireless communication interface, detecting coincidence between said computer identification information within said connecting request and said computer identification information stored in said computer identification information storing means, and connection completion notifying means for, when said coincidence is detected by said coincidence detecting means, returning to said terminal a response indicating that said computer system is connected with said terminal, via said wireless communication interface.

3. The computer system according to claim 2, further comprising:

a display used for displaying at least that said computer system is connected to said terminal, wherein said system management controller includes a display means for displaying that said computer system is connected to said terminal on said display when a response indicating that said computer system is connected to said terminal is returned to said terminal.

4. A computer system managed by a terminal having a wireless communication function, comprising:

a CPU, connected to a first bus, which controls the computer system;

a wireless communication interface capable of wireless communication with said terminal;

a system management controller connected to said wireless communication interface, for performing system management instructed by said terminal, through wireless communication with said terminal via said wireless communication interface; and a system management bus operable even at a non-activation time of said computer system, which is directly or indirectly connected to various information storing means of said computer system, wherein the CPU accesses the various information storing means via the first bus when the computer system is in an active state and said system management controller includes an information access means for recovering, modifying, or reading out information on said information storing means, via said system management bus, depending on a received request for recovering, modifying, or reading out said information on said information storing means of said computer system from said terminal when the computer system is in a non-active state.

5. The computer system according to claim 4, further comprising:

a bridge connected to said system management bus; and a non-volatile memory writable for storing a basic input/out system program, which is connected to said bridge and said system management bus, wherein said information access means of said system management controller gains access to said non-volatile memory via said system management bus only at said non-activation time of said computer system.

6. The computer system according to claim 4, further comprising:

a first bridge to which a first bus, a second bus, and a main memory that is one of said various information storing means are connected; and a second bridge mutually connecting said second bus and said system management bus, wherein said information access means of said system management controller accesses said main memory via said system management bus, said second bridge, said second bus, and said first bridge, under control of said CPU, at said non-activation time of said computer system.

7. The computer system according to claim 6, wherein said first bridge includes an abnormal time access interface for connecting said main memory to said system management bus at said non-activation time of said computer system, and said information access means of said system management controller accesses said main memory via said system management bus at said non-activation time of said computer system.

8. The computer system according to claim 4, further comprising:

a first bridge mutually connecting a first bus and a second bus;

a second bridge to which said second bus, said system management bus, and a disk drive that is one of said various information storing means are connected, wherein said information access means of said system management controller gains access to said disk drive via said system management bus and said second bridge, under control of said CPU, at said non-activation time of said computer system.

9. The computer system according to claim 8, wherein said second bridge includes an abnormal time access interface for connecting said disk drive to said system management bus at said non-activation time of said computer system, and said information access means of said system management controller accesses to said disk drive via said system management bus at said non-activation time of said computer system.

10. A computer management system comprising:

a CPU, connected to a first bus, which controls the computer management system;

a non-volatile memory, connected to the first bus and a second bus, which stores a basic input/output system program;

a terminal having a wireless communication function; and a plurality of computer systems capable of managing a system by said terminal, wherein said computer management system comprises a wireless communication interface capable of wireless communication with said terminal, a system management controller connected to said wireless communication interface, for performing system management instructed by said terminal, through said wireless communication with said terminal via said wireless communication interface, wherein the CPU accesses the non-volatile memory via the first bus when the computer management system is in an active state and the system management controller accesses the non-volatile memory via the second bus when the computer management system is in a non-active state.

11. The computer management system according to claim 10, further comprising:

a local area network connecting said terminal and said plurality of said computer systems, wherein said terminal selects either wireless communication or cable communication via said local area network so as to communicate with said system managing controller of said computer management system, for managing a system of said plurality of said computer systems.

* * * * *

UNITED STATES PATENT AND TRADEMARK OFFICE
CERTIFICATE OF CORRECTION

PATENT NO.    : 6,820,119 B1
DATED         : November 16, 2004
INVENTOR(S)   : Omizo It is certified that error appears in the above-identified patent and that said Letters Patent is hereby corrected as shown below:

Column 13,
Lines 46-47, change "input/out" to -- input/output --.

Signed and Sealed this

Twenty-fourth Day of May, 2005

JON W. DUDAS
*Director of the United States Patent and Trademark Office*